United States Patent
Agarmore et al.

(10) Patent No.: US 10,320,831 B2
(45) Date of Patent: Jun. 11, 2019

(54) SYSTEMS AND METHODS FOR APPLYING SECURITY UPDATES TO ENDPOINT DEVICES

(71) Applicant: Symantec Corporation, Mountain View, CA (US)

(72) Inventors: Prasad Agarmore, Yavatmal (IN); Karan Khanna, Pune (IN)

(73) Assignee: Symantec Corporation, Mountain View, CA (US)

( * ) Notice: Subject to any disclaimer, the term of this patent is extended or adjusted under 35 U.S.C. 154(b) by 236 days.

(21) Appl. No.: 15/231,692

(22) Filed: Aug. 8, 2016

(65) Prior Publication Data
US 2017/0374094 A1    Dec. 28, 2017

(51) Int. Cl.
*H04L 29/06*    (2006.01)

(52) U.S. Cl.
CPC .......... *H04L 63/1441* (2013.01); *H04L 63/10* (2013.01)

(58) Field of Classification Search
CPC ........................ H04L 63/1433; H04L 63/1441
USPC ........................................................... 726/25
See application file for complete search history.

(56) References Cited

U.S. PATENT DOCUMENTS

| | | | | |
|---|---|---|---|---|
| 8,683,598 B1* | 3/2014 | Cashin | ..................... | H04L 63/20 713/188 |
| 8,726,391 B1* | 5/2014 | Zhong | ..................... | G06F 21/56 726/25 |
| 2006/0080656 A1* | 4/2006 | Cain | ......................... | G06F 8/65 717/174 |
| 2010/0070772 A1* | 3/2010 | Nakamura | ............. | G01C 21/32 713/176 |
| 2015/0117165 A1* | 4/2015 | Stotz | ....................... | G04F 8/006 368/228 |
| 2015/0121360 A1* | 4/2015 | Gil | ............................ | G06F 8/65 717/172 |
| 2015/0178070 A1* | 6/2015 | Doi | .......................... | G06F 8/61 717/172 |

OTHER PUBLICATIONS

Heartbeat (computing); https://en.wikipedia.org/wiki/Heartbeat_(computing), as accessed May 2, 2016; Wikipedia; Oct. 5, 2013.
Ke Fang et al.; Systems and Methods for Automatic Endpoint Protection and Policy Management; U.S. Appl. No. 13/940,902, filed Jul. 12, 2013.

* cited by examiner

*Primary Examiner* — Teshome Hailu
(74) *Attorney, Agent, or Firm* — FisherBroyles, LLP (57) ABSTRACT

The disclosed computer-implemented method for applying security updates to endpoint devices may include (1) calculating a reputation score for an endpoint device that indicates a security state of the endpoint device, (2) transmitting, from the endpoint device to a security server that provides security updates, a request to receive a security update with a degree of urgency based on the reputation score of the endpoint device, (3) receiving the security update from the security server in accordance with the degree of urgency, and then (4) applying the security update within the endpoint device. Various other methods, systems, and computer-readable media are also disclosed.

16 Claims, 6 Drawing Sheets

| Update Request and Distribution Schedule 402 | | |
|---|---|---|
| REPUTATION SCORE | REQUEST FREQUENCY | UPDATE-DISTRIBUTION QUEUE |
| 0-2 | 60 minutes | Queue 4 (lowest priority) |
| 3-5 | 30 minutes | Queue 3 |
| 6-8 | 10 minutes | Queue 2 |
| 9-10 | 5 minutes | Queue 1 (highest priority) |

SYSTEMS AND METHODS FOR APPLYING SECURITY UPDATES TO ENDPOINT DEVICES

BACKGROUND

Endpoint devices within organizations often receive security updates (e.g., new malware signatures, upgraded security policies, etc.) from backend servers that provide security services for the organization. In organizations with large numbers of endpoint devices, security servers may distribute updates to the endpoint devices only after the devices poll the security server for available updates.

Unfortunately, traditional systems that enable endpoint devices to request security updates may be unable to provide adequate protection for certain endpoint devices. For example, a conventional security service implemented across multiple endpoint devices may set a standard rate or frequency with which the endpoint devices request or receive updates. As a result, endpoint devices with poor security states (e.g., devices with malware infections and/or devices that are likely to encounter malware) may experience increased security deficiencies until the devices next poll a security server for available security updates. The current disclosure, therefore, identifies and addresses a need for improved systems and methods for applying security updates to endpoint devices.

SUMMARY

As will be described in greater detail below, the instant disclosure describes various systems and methods for applying security updates to endpoint devices by requesting that endpoint devices within an organization receive security updates from a security server in an order that prioritizes endpoint devices that have poor security states. In one example, a computer-implemented method for performing such a task may include (1) calculating a reputation score for an endpoint device that indicates a security state of the endpoint device, (2) transmitting, from the endpoint device to a security server that provides security updates, a request to receive a security update with a degree of urgency based on the reputation score of the endpoint device, (3) receiving the security update from the security server in accordance with the degree of urgency, and then (4) applying the security update within the endpoint device.

In some examples, the reputation score for the endpoint device may be based on unsafe behaviors performed by a user of the endpoint device that potentially expose the endpoint device to security threats. Additionally or alternatively, the reputation score may be based on security threats already on the endpoint device.

In some embodiments, the security server may maintain multiple update-distribution queues with varying distribution priorities, where an update-distribution queue with a low distribution priority distributes the security update to endpoint devices after an update-distribution queue with a higher distribution priority distributes the security update. In such embodiments, transmitting the request to receive the security update with the degree of urgency may include requesting that the security server assign the endpoint device to an update-distribution queue with a distribution priority appropriate for the endpoint device based on the reputation score of the endpoint device. Additionally or alternatively, transmitting the request to receive the security update may include periodically transmitting requests to receive available security updates with a frequency based on the reputation score of the endpoint device.

In some examples, the degree of urgency may be based on a comparison between the reputation score for the endpoint device and a reputation score for at least one additional endpoint device that receives security updates from the security server. In these examples, the method may further include determining, based on the comparison between the reputation score for the endpoint device and the reputation score for the additional endpoint device, that the endpoint device is at a greater risk of security threats than the additional endpoint device. The method may then include transmitting, from the additional endpoint device, an additional request to receive the security update with a degree of urgency that is lower than the degree of urgency included in the request sent from the endpoint device. In addition, the method may include determining that the endpoint device receives the security update from the security server before the additional endpoint device.

In some embodiments, the method may further include updating the reputation score for the endpoint device to indicate a current security state of the endpoint device. In such embodiments, the method may also include transmitting an additional request to receive an additional security update with a degree of urgency based on the updated reputation score of the endpoint device.

In some examples, the method may further include detecting a security threat on the endpoint device using the security update. In these examples, the method may then include performing a security action to mitigate the security threat. The security action may include removing a malicious file from the endpoint device, reporting the security threat to an administrator of the endpoint device, and/or increasing security protocols on the endpoint device.

In one embodiment, a system for implementing the above-described method may include (1) a reputation module that calculates a reputation score for an endpoint device that indicates a security state of the endpoint device, (2) a request module that transmits, from the endpoint device to a security server that provides security updates, a request to receive a security update with a degree of urgency based on the reputation score of the endpoint device, and (3) an update module that (A) receives the security update from the security server in accordance with the degree of urgency and (B) applies the security update to within the endpoint device. In addition, the system may include at least one hardware processor configured to execute the reputation module, the request module, and the update module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) calculate a reputation score for an endpoint device that indicates a security state of the endpoint device, (2) transmit, from the endpoint device to a security server that provides security updates, a request to receive a security update with a degree of urgency based on the reputation score of the endpoint device, (3) receive the security update from the security server in accordance with the degree of urgency, and then (4) apply the security update within the endpoint device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for applying security updates to endpoint devices. As will be explained in greater detail below, after determining the security status and/or hygiene of an endpoint device, the systems and methods described herein may request that the endpoint device receive security updates from a backend server with a priority and/or frequency based on the security needs of the endpoint device. As such, the disclosed systems and methods may ensure that vulnerable or compromised devices within an organization quickly receive important security updates (e.g., compared to healthy endpoint devices), while balancing or reducing the workload of a security server that provides the updates.

Figure 1:
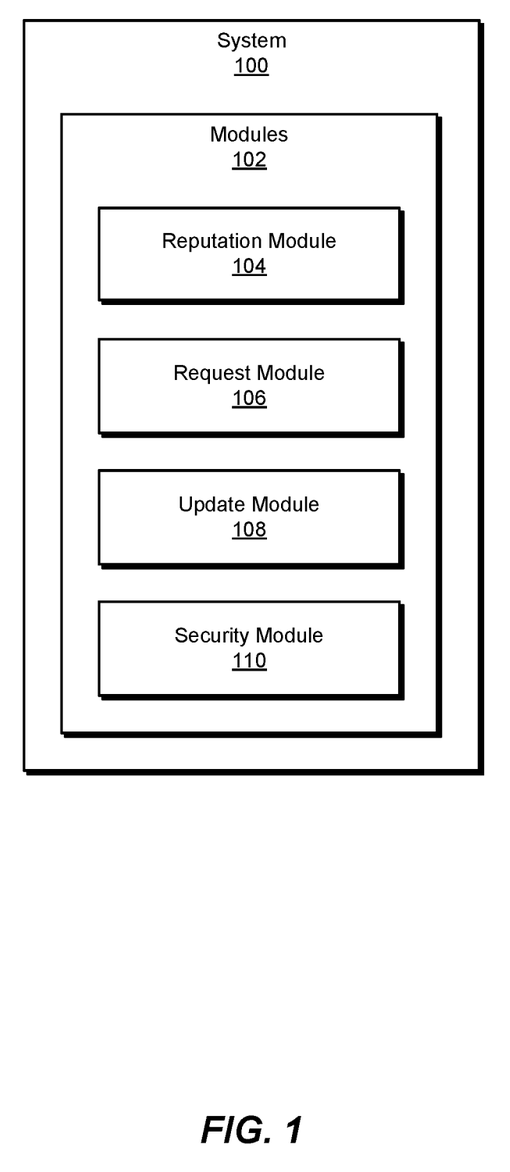
FIG. 1 is a block diagram of an exemplary system for applying security updates to endpoint devices.
Figure 2:
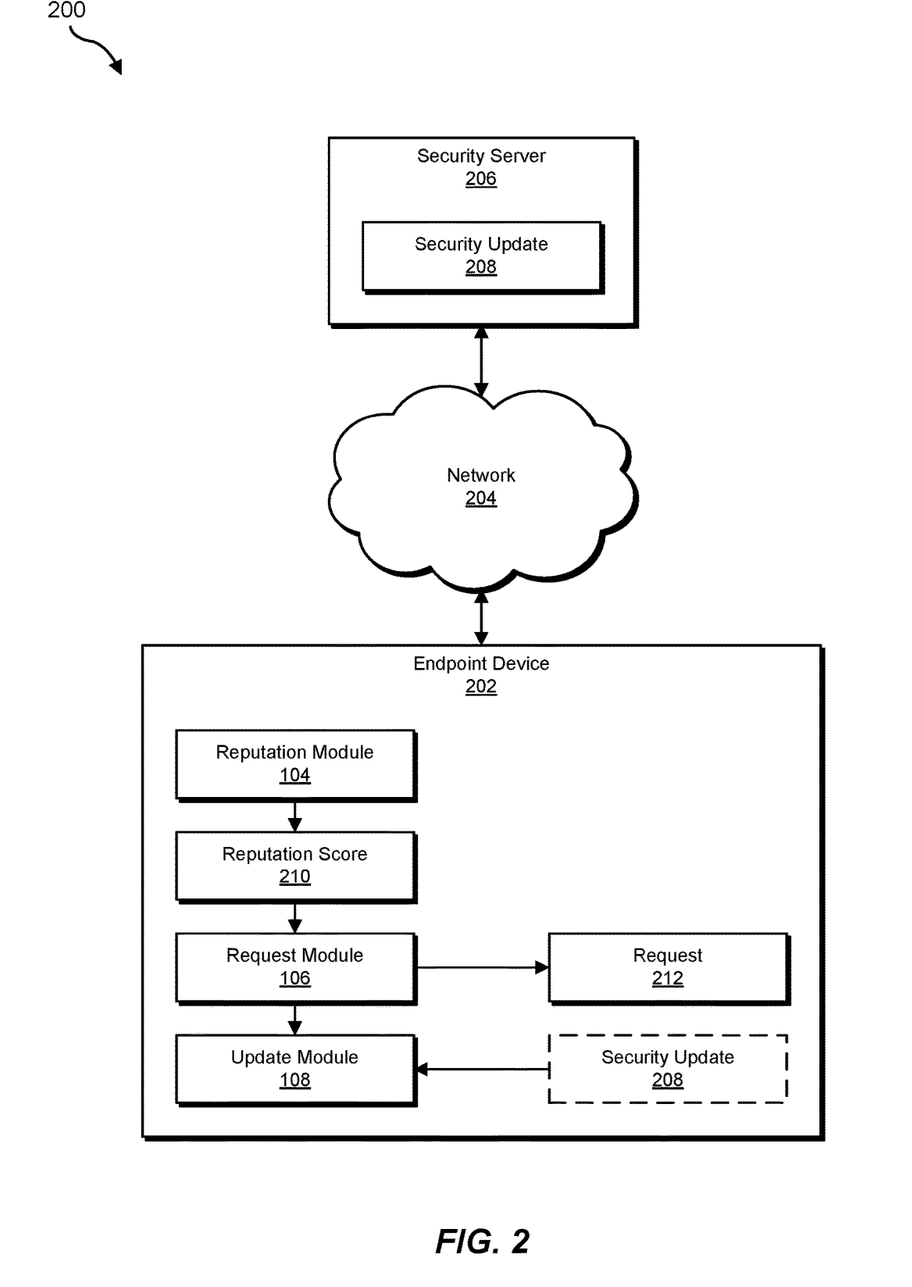
FIG. 2 is a block diagram of an additional exemplary system for applying security updates to endpoint devices.

The following will provide, with reference to FIGS. 1 and 2, detailed descriptions of exemplary systems for applying security updates to endpoint devices. Detailed descriptions of corresponding computer-implemented methods will also be provided in connection with FIG. 3. In addition, detailed descriptions of exemplary schedules for requesting and distributing security updates will be provided in connection with FIG. 4. Finally, an exemplary computing system and network architecture capable of implementing one or more of the embodiments described herein will be provided in connection with FIGS. 5 and 6, respectively.

FIG. 1 is a block diagram of an exemplary system 100 for applying security updates to endpoint devices. As illustrated in this figure, exemplary system 100 may include one or more modules 102 for performing one or more tasks. For example, and as will be explained in greater detail below, exemplary system 100 may include a reputation module 104 that calculates a reputation score for an endpoint device that indicates a security state of the endpoint device. Exemplary system 100 may also include a request module 106 that transmits, from the endpoint device to a security server that provides security updates, a request to receive a security update with a degree of urgency based on the reputation score of the endpoint device.

In addition, and as will be described in greater detail below, exemplary system 100 may include an update module 108 that receives the security update from the security server in accordance with the degree of urgency and then applies the security update within the endpoint device. Finally, exemplary system 100 may include a security module 110 that detects a security threat on the endpoint device using the security update and then performs a security action to mitigate the security threat. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., endpoint device 202 and/or security server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include an endpoint device 202 in communication with a security server 206 via a network 204. In one example, endpoint device 202 may be programmed with one or more of modules 102. In this example, modules 102 may operate as part of a security and/or update service that provides security updates to endpoint device 202. Additionally or alternatively, security server 206 may be programmed with one or more of modules 102. In these examples, security server 206 may distribute security updates to the service operating on endpoint device 202.

In one embodiment, one or more of modules 102 from FIG. 1 may, when executed by at least one processor of endpoint device 202, enable endpoint device 202 to apply security updates to endpoint device 202. For example, and as will be described in greater detail below, reputation module 104 may cause endpoint device 202 to calculate a reputation score 210 that indicates a security state of endpoint device 202. In addition, request module 106 may cause endpoint device 202 to transmit, to security server 206, a request 212 to receive a security update 208 with a degree of urgency based on reputation score 210. Next, update module 108 may cause endpoint device 202 to receive security update 208 from security server 206 in accordance with the degree of urgency. Finally, update module 108 may cause endpoint device 202 to then apply security update 208 within endpoint device 202.

Endpoint device 202 generally represents any type or form of computing device capable of reading computer-executable instructions. Examples of endpoint device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 510 in FIG. 5, or any other suitable computing device.

Security server 206 generally represents any type or form of computing device that is capable of generating, storing, and/or distributing security updates. Examples of security server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between endpoint device 202 and security server 206.

Figure 3:
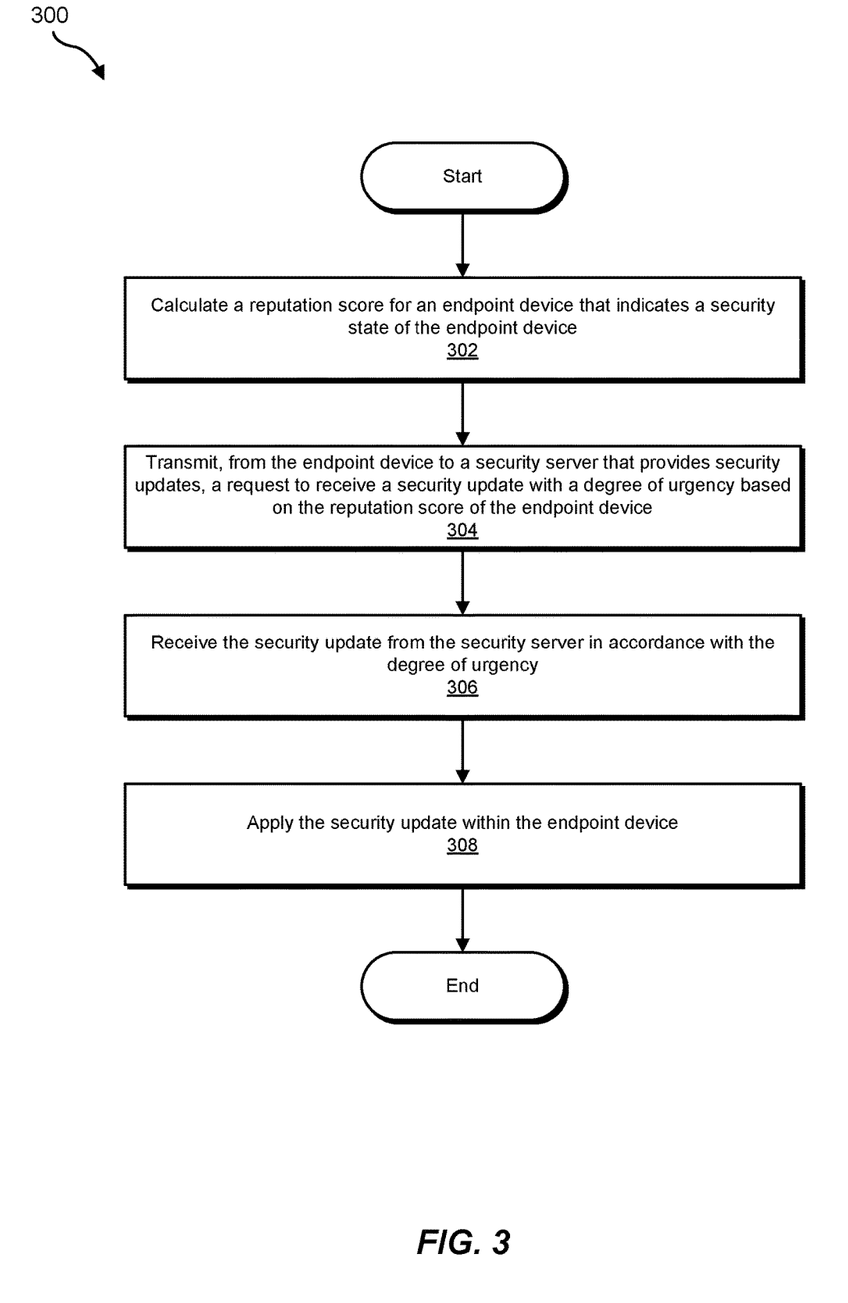
FIG. 3 is a flow diagram of an exemplary method for applying security updates to endpoint devices.

FIG. 3 is a flow diagram of an exemplary computer-implemented method 300 for applying security updates to endpoint devices. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may calculate a reputation score for an endpoint device that indicates a security state of the endpoint device. For example, reputation module 104 may, as part of endpoint device 202 in FIG. 2, calculate reputation score 210 that indicates a security state of endpoint device 202.

The term "security state," as used herein, generally refers to the overall health, safety, hygiene, well-being, performance, and/or functionality of an endpoint device. In one example, an endpoint device with a good or healthy security state may be free of security threats (e.g., malware infections, intrusions, or other security breaches). Additionally or alternatively, an endpoint device with a good security state may implement sufficient security protocols and/or not engage in behaviors that potentially expose the endpoint device to security threats. In contrast, an endpoint device with a poor security state have been compromised by one or more security threats and/or may not take proper precautions to protect against security threats.

Additionally, the term "reputation score," as used herein, generally refers to any type or form of numerical representation that quantifies or indicates the security state of an endpoint device. In some examples, the systems described herein may indicate the reputation score for an endpoint device as a number within a certain range (e.g., 0-10, with "0" indicating a good security state and "10" indicating a poor security state).

The systems described herein may calculate a reputation score for an endpoint device in a variety of ways. In some examples, reputation module 104 may analyze, search, or monitor an endpoint device for any indication that the endpoint device has been or may be compromised by a security threat. For example, reputation module 104 may identify each instance of an unexpected, anomalous, and/or malicious file or behavior within the endpoint device. Reputation module 104 may detect such indications of security threats using any suitable technique or analysis, such as by scanning an endpoint device for known traces of malware and/or analyzing event logs that describe suspicious or malicious activities occurring within a device.

Additionally or alternatively, reputation module 104 may determine the security state of an endpoint device by monitoring behaviors of a user of the endpoint device. For example, reputation module 104 may detect each time that a user accesses an unsecure network connection, clicks on a suspicious link, and/or executes an unverified file. In some examples, such behaviors may indicate that an endpoint device is at an increased risk of being exposed to future security threats.

After detecting and/or gathering information indicative of the security state of an endpoint device, reputation module 104 may compile or transform the information into a reputation score for the endpoint device. For example, reputation module 104 may calculate a reputation score for an endpoint device based on the number of suspicious and/or anomalous events detected on the endpoint device. In one example, a reputation score may be directly related (e.g., proportional) to the number of detected suspicious events. In another example, reputation module 104 may assign a weight to one or more suspicious events based on a likelihood that the events indicate a security threat. Reputation module 104 may then calculate a reputation score for an endpoint device by accumulating the weights of each suspicious event detected on the endpoint device.

In some embodiments, reputation module 104 may calculate reputation scores for each endpoint device within a group of endpoint devices (e.g., each endpoint device within an organization or enterprise). In some examples, the reputation score for an endpoint device within a group of devices may be relative to and/or based on the reputation scores of the other devices within the group. Specifically, reputation module 104 may assign reputation scores to the devices within the group such that the reputation scores conform to a predetermined distribution. As an example, in the event that reputation module 104 assigns reputation scores as integers between 1 and 10, reputation module 104 may assign each possible score to 10% of the endpoint devices within an organization.

Additionally, in some embodiments, reputation module 104 may dynamically update or re-calculate a reputation score for an endpoint device. For example, reputation module 104 may periodically (e.g., every day, every week, etc.) analyze an endpoint device to detect changes in the security state of the endpoint device. Alternatively, reputation module 104 may continually monitor an endpoint device to detect such changes in real time. After detecting a change to the security state of an endpoint device, reputation module 104 may compute a new or revised reputation score for the endpoint device that reflects the change.

Returning to FIG. 3, at step 304 one or more of the systems described herein may transmit, from the endpoint device to a security server that provides security updates, a request to receive a security update with a degree of urgency based on the reputation score of the endpoint device. For example, request module 106 may, as part of endpoint device 202 in FIG. 2, transmit, from endpoint device 202 to security server 206, request 212 to receive security update 208 with a degree of urgency based on reputation score 210.

The term "security update," as used herein, generally refers to any type or form of improvement, replacement, or addition to an existing policy, rule, or set of criteria used to detect and/or prevent security threats on an endpoint device. In one example, a security update may contain malware signatures or definitions that represent or summarize files or behaviors known to be malicious. When implemented on an endpoint device, the security update may compare files accessed by the endpoint device to the malware signatures to determine whether to prevent or allow access to the files. In another example, a security update may include a security policy that controls or limits the behavior of a user, application, process, network connection, etc. In some embodiments, a security service may host or manage a backend security server (such as security server 206 in FIG. 2) that periodically generates or receives security updates and then distributes the security updates to one or more endpoint devices.

In addition, the term "degree of urgency," as used herein, generally refers to any indication of the speed, timing, order, or priority with which an endpoint device requests to receive one or more security updates. As will be explained in greater detail below, an endpoint device that requests to receive a security update with a high degree of urgency may receive the update at a sooner point in time than an endpoint device that requests to receive the update with a low degree of urgency.

The systems described herein may transmit a request to receive a security update with a certain degree of urgency in a variety of ways. In some examples, a degree of urgency may represent a frequency with which request module 106 periodically transmits requests to receive available security updates. This frequency may be referred to as an update heartbeat or heartbeat interval. In these examples, request module 106 may set the heartbeat interval for an endpoint device based on the reputation score of the endpoint device. For example, request module 106 may set a more frequent heartbeat interval for an endpoint device whose reputation score indicates a poor security state than an endpoint device whose reputation score indicates a healthy or satisfactory security state.

Figure 4:
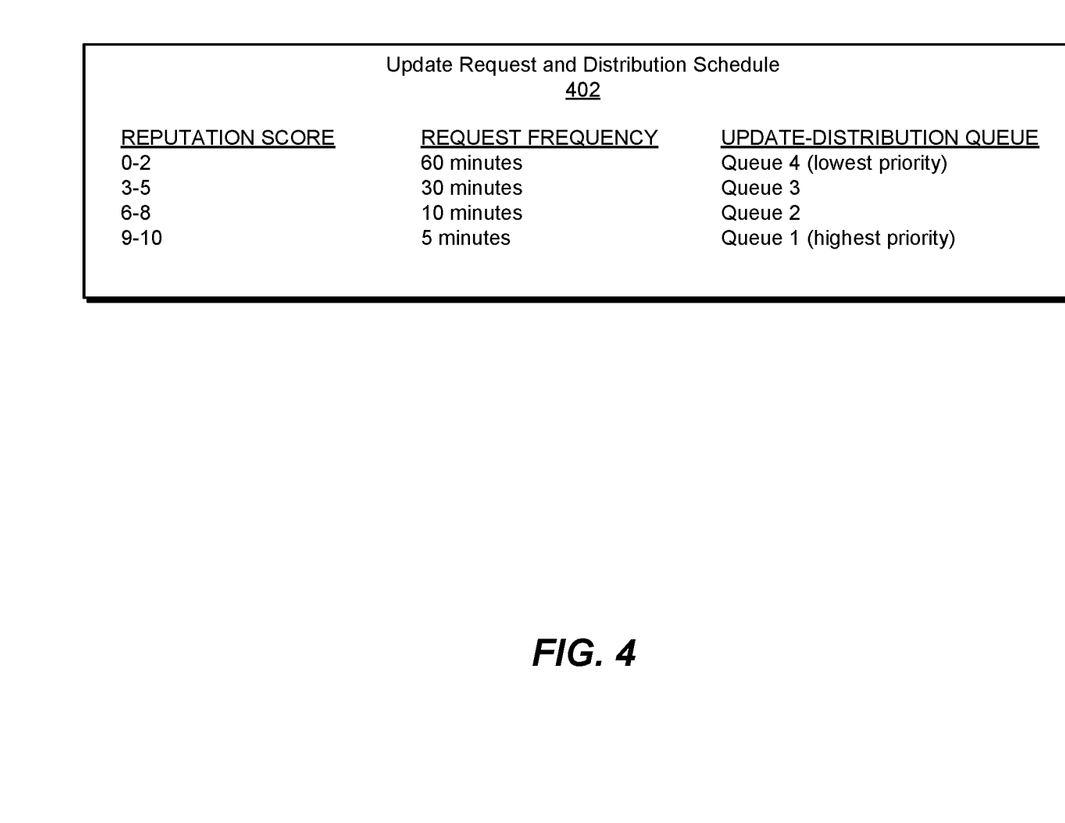
FIG. 4 is an illustration of an exemplary schedule for requesting and distributing security updates.

As an example, FIG. 4 shows an update request and distribution schedule 402 that indicates request frequencies (e.g., heartbeat intervals) corresponding to various reputation scores. In this example, reputation module 104 may assign endpoint devices a reputation score between 0 and 10, with a score of 0 indicating that a device is healthy (e.g., contains little or no evidence of security threats) and a score of 10 indicating that a device has been severely compromised by security threats. As shown in FIG. 4, endpoint devices with low reputation scores (e.g., between 0 and 2) may request security updates at a low frequency (e.g., every 60 minutes). In contrast, FIG. 4 indicates that endpoint devices with high reputation scores (e.g., 9 and 10) may request security updates at a relatively high frequency (e.g., every 5 minutes).

In other examples, a degree of urgency may represent a priority with which an endpoint device requests to receive a security update from a security server (e.g., with respect to other endpoint devices). For example, a security server may maintain multiple update-distribution queues that are used to distribute security updates to endpoint devices. Each update-distribution queue may have a different distribution priority that indicates an order with which endpoint devices receive security updates. Specifically, a security server may distribute a security update to each endpoint device assigned to the update-distribution queue with the highest priority before distributing the update to the devices assigned to the update-distribution queue with the next-highest priority.

When a security server receives a request from an endpoint device to receive a security update, the security server may assign the endpoint device to an update-distribution queue that has a distribution priority most appropriate for the endpoint device. In some examples, request module 106 may directly indicate, within a request sent from an endpoint device, the update-distribution queue that is appropriate for the endpoint device. In other examples, request module 106 may include the reputation score of the endpoint device within the request and the security server may assign the endpoint device to an update-distribution queue based on the reputation score.

Referring to the example of FIG. 4, update request and distribution schedule 402 may also indicate an update-distribution queue that corresponds to each reputation score range. As shown in FIG. 4, endpoint devices with low reputation scores (e.g., between 0 and 2) may be assigned to queue 4 (which has the lowest priority), while endpoint devices with high reputation scores (e.g., 9 and 10) may be assigned to queue 1 (which has the highest priority).

As previously mentioned, in some examples, reputation module 104 may periodically update or re-calculate the reputation score for an endpoint device. In these examples, request module 106 may make corresponding changes to the degree of urgency with which the endpoint device requests security updates. For example, in the event that reputation module 104 determines that the reputation score of an endpoint device has decreased (e.g., from 7 to 5 within a scale of 0-10), request module 106 may decrease the frequency with which the endpoint device requests security updates (e.g., from every 10 minutes to every 30 minutes).

As described above, the disclosed systems provide two distinct methods for enabling an endpoint device to request security updates: (1) periodically requesting security updates with a frequency based on a reputation score of the endpoint device and (2) requesting that a security server place the endpoint device in an update-distribution queue with a distribution priority befitting the reputation score of the endpoint device. While these methods may be implemented individually, an organization may select to incorporate both methods in order to most effectively provide security updates to endpoint devices within the organization.

Returning to FIG. 3, at step 306 one or more of the systems described herein may receive the security update from the security server in accordance with the degree of urgency. For example, update module 108 may, as part of endpoint device 202 in FIG. 2, receive security update 208 from security server 206 in accordance with the degree of urgency.

The systems described herein may receive a security update in accordance with a degree of urgency in a variety of ways. In some examples, update module 108 may receive security updates at time intervals corresponding to the frequency with which request module 106 transmits requests to receive available security updates. In these examples, an endpoint device that requests updates with a high frequency (e.g., every 10 minutes) may receive a security update before another endpoint device that requests updates with a lower frequency (e.g., every 60 minutes) receives the same update.

Additionally or alternatively, an endpoint device may receive a security update in accordance with the priority of the update-distribution queue into which the endpoint device was placed. For example, when a security update becomes available on a security server, the security server may begin distributing the update to each endpoint device listed within the update-distribution queues maintained by the security server. Accordingly, an endpoint device that has been placed into an update-distribution queue with a high priority (e.g., queue 1 in FIG. 4) may receive the update before an endpoint device that has been placed into an update-distribution queue with a lower priority (e.g., queues 2-4 in FIG. 4).

Notably, in some embodiments, an endpoint device may not receive a security update from a security server until after requesting the update. For example, a security server within an organization may not automatically distribute security updates to each endpoint device within the organization as soon as the updates become available. Instead, the systems described herein may enable endpoint devices to request and receive security updates with an urgency that is appropriate for the security needs of the individual endpoint devices. As such, endpoint devices with poor security states may quickly receive available updates from a security server, while the security server may not be burdened with frequently distributing updates to endpoint devices with healthy security states.

Returning to FIG. 3, at step 308 one or more of the systems described herein may apply the security update within the endpoint device. For example, update module 108 may, as part of endpoint device 202 in FIG. 2, apply security update 208 within endpoint device 202.

The systems described herein may apply a security update to an endpoint device in a variety of ways. In some examples, update module 108 may incorporate a security update into an existing set of security updates previously received at an endpoint device. For example, update module 108 may replace all or a portion of an existing security policy with the security update (e.g., in the event that the existing security policy is outdated or inaccurate). In another example, in the event that a security update contains new malware signatures, update module 108 may supplement malware signatures already stored within an endpoint device with the new malware signatures. Furthermore, in some examples, update module 108 may apply a security update within an endpoint device by installing or executing a file containing the security update.

After a security update is applied within an endpoint device, the systems described herein may use the security update to protect the endpoint device from security threats. For example, security module 110 may use the security update to detect that a user of an endpoint device is attempting to run a malicious file and/or access a malicious website identified by the security update. In response to detecting a security threat on an endpoint device, security module 110 may perform one or more security actions to mitigate the threat. For example, security module 110 may remove or block files or other data associated with the security threat. Additionally or alternatively, security module 110 may increase security protocols on an endpoint device to reduce the risk of future security threats. Furthermore, in some examples, security module 110 may alert a user or administrator about a security threat and direct the user or administrator to perform an appropriate action to mitigate the threat.

As explained above in connection with FIG. 3, a security service running on one or more endpoint devices within an organization may calculate reputation scores for the endpoint devices that indicate the security states of the endpoint devices. The security service may then request that a back-end security server send available security updates to each endpoint device with a frequency and/or priority based on the reputation score of the endpoint device. As such, endpoint devices with poor security states (e.g., that are at a greater risk of malware infections or other security threats) may receive security updates more quickly than endpoint devices with healthy security states.

Figure 5:
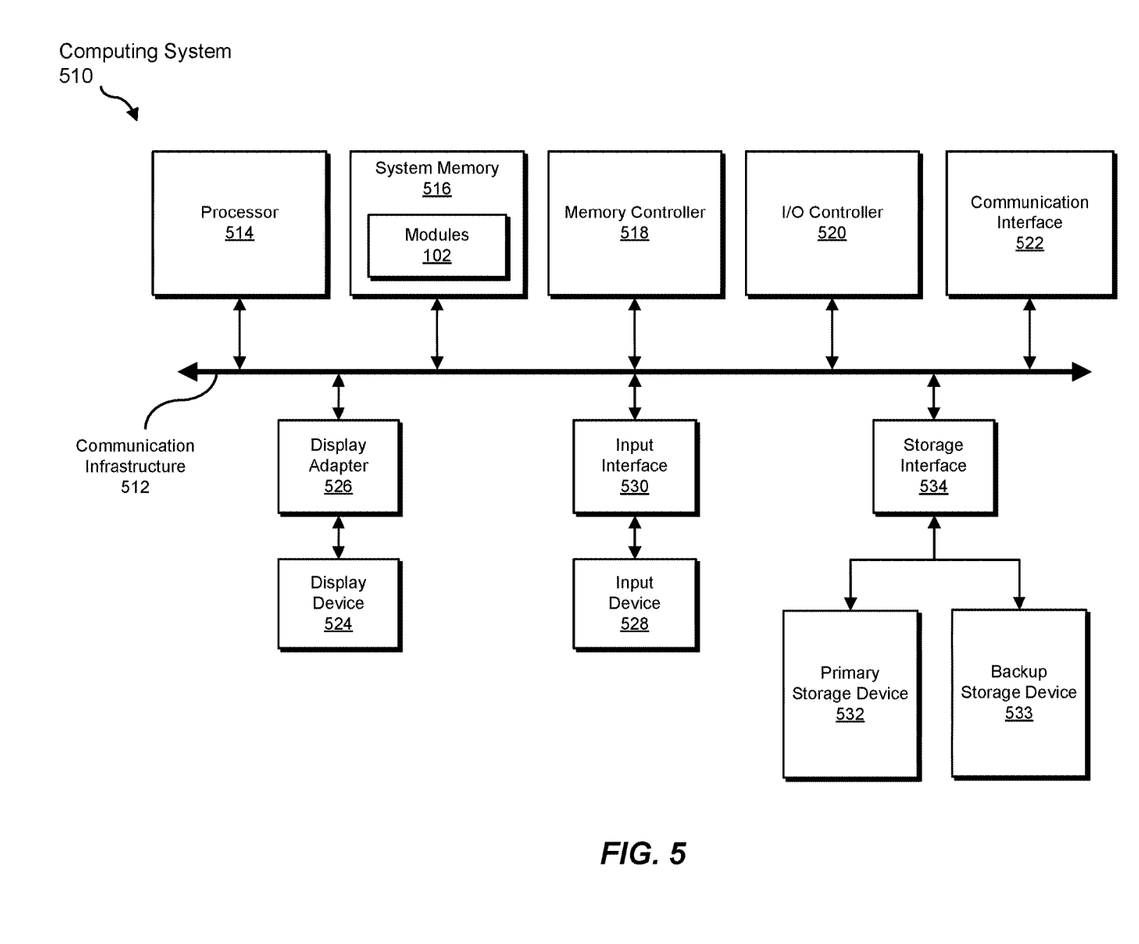
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
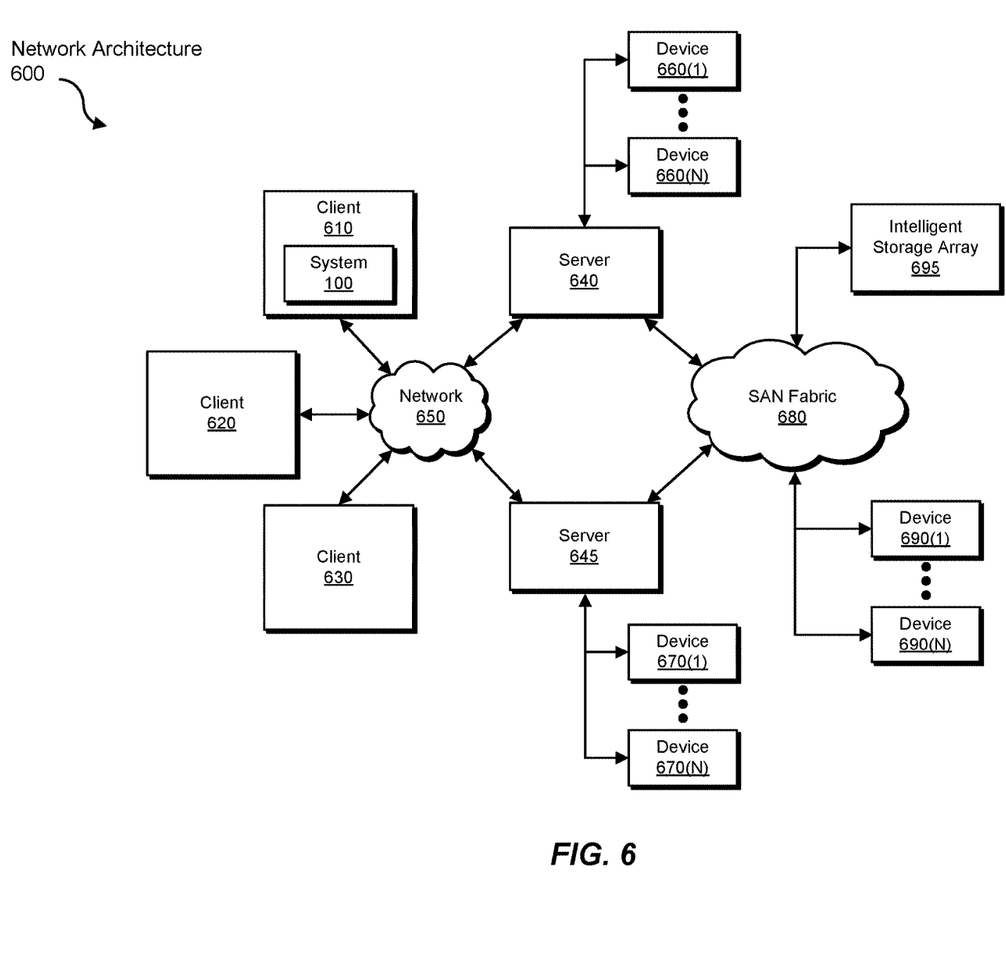
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for applying security updates to endpoint devices.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a reputation score for an endpoint device that indicates a security state of the endpoint device, transform the reputation score into a degree of urgency with which to request a security update, output a result of the transformation to a security server that provides the security update, use the result of the transformation to receive the security update at the endpoint device, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for applying security updates to endpoint devices, at least a portion of the method being performed by a computing device comprising at least one processor, the method comprising:
    calculating a reputation score for an endpoint device that indicates a security state of the endpoint device;

determining, based at least in part on the reputation score of the endpoint device, an appropriate frequency with which to request security updates for the endpoint device, wherein:
high frequencies are appropriate for reputation scores indicative of poor security states; and
low frequencies are appropriate for reputation scores indicative of healthy security states;
determining, based at least in part on the reputation score of the endpoint device, an appropriate position for the endpoint device within an update-distribution queue maintained by a security server that provides security updates, wherein:
positions near the front of the update-distribution queue are appropriate for the reputation scores indicative of poor security states; and
positions near the end of the update-distribution queue are appropriate for the reputation scores indicative of healthy security states;
transmitting, from the endpoint device to the security server, a request for the security server to:
send the security updates to the endpoint device with the appropriate frequency; and
place the endpoint device at the appropriate position within the update-distribution queue;
receiving the security updates from the security server in accordance with at least one of:
the appropriate frequency; and
the appropriate position within the update-distribution queue; and
applying the security updates within the endpoint device.

2. The method of claim 1, wherein the reputation score for the endpoint device is based on at least one of:
unsafe behaviors performed by a user of the endpoint device that potentially expose the endpoint device to security threats; and
security threats already on the endpoint device.

3. The method of claim 1, wherein determining the appropriate frequency further comprises comparing the reputation score for the endpoint device and a reputation score for at least one additional endpoint device that receives the security updates from the security server.

4. The method of claim 3, further comprising:
determining, based on the comparison between the reputation score for the endpoint device and the reputation score for the additional endpoint device, that the endpoint device is at a greater risk of security threats than the additional endpoint device;
transmitting, from the additional endpoint device, an additional request to receive the security updates with a frequency that is lower than the appropriate frequency; and
determining that the endpoint device receives the security updates from the security server before the additional endpoint device.

5. The method of claim 1, further comprising:
updating the reputation score for the endpoint device to indicate a current security state of the endpoint device; and
transmitting an additional request to receive additional security updates with a frequency based on the updated reputation score of the endpoint device.

6. The method of claim 1, further comprising:
detecting a security threat on the endpoint device using the security updates; and
performing a security action to mitigate the security threat.

7. The method of claim 6, wherein the security action comprises at least one of:
removing a malicious file from the endpoint device;
reporting the security threat to an administrator of the endpoint device; and
increasing security protocols on the endpoint device.

8. A computer-implemented system for applying security updates to endpoint devices, the system comprising:
a memory;
a reputation module, stored in the memory, that calculates a reputation score for an endpoint device that indicates a security state of the endpoint device;
a request module, stored in the memory, that:
determines, based at least in part on the reputation score of the endpoint device, an appropriate frequency with which to request security updates for the endpoint device, wherein:
high frequencies are appropriate for reputation scores indicative of poor security states; and
low frequencies are appropriate for reputation scores indicative of healthy security states; and
determines, based at least in part on the reputation score of the endpoint device, an appropriate position for the endpoint device within an update-distribution queue maintained by a security server that provides security updates, wherein:
positions near the front of the update-distribution queue are appropriate for the reputation scores indicative of poor security states; and
positions near the end of the update-distribution queue are appropriate for the reputation scores indicative of healthy security states;
transmits, from the endpoint device to the security server, a request for the security server to:
send the security updates to the endpoint device with the appropriate frequency; and
place the endpoint device at the appropriate position within the update-distribution queue;
an update module, stored in the memory, that:
receives the security updates from the security server in accordance with at least one of:
the appropriate frequency; and
the appropriate position within the update-distribution queue; and
applies the security updates within the endpoint device; and
at least one hardware processor that executes the reputation module, the request module, and the update module.

9. The system of claim 8, wherein the reputation score for the endpoint device is based on at least one of:
unsafe behaviors performed by a user of the endpoint device that potentially expose the endpoint device to security threats; and
security threats already on the endpoint device.

10. The system of claim 8, wherein the request module determines the appropriate frequency based further on a comparison between the reputation score for the endpoint device and a reputation score for at least one additional endpoint device that receives the security updates from the security server.

11. The system of claim 10, wherein:
the request module further determines, based on the comparison between the reputation score for the endpoint device and the reputation score for the additional endpoint device, that the endpoint device is at a greater risk of security threats than the additional endpoint device;

the request module further transmits, from the additional endpoint device, an additional request to receive the security updates with a frequency that is lower than the appropriate frequency; and the update module further determines that the endpoint device receives the security updates from the security server before the additional endpoint device.

12. The system of claim 8, wherein:

the reputation module updates the reputation score for the endpoint device to indicate a current security state of the endpoint device; and the request module transmits an additional request to receive additional security updates with a frequency based on the updated reputation score of the endpoint device.

13. The system of claim 8, further comprising a security module that:

detects a security threat on the endpoint device using the security updates; and performs a security action to mitigate the security threat.

14. The system of claim 13, wherein the security action comprises at least one of:

removing a malicious file from the endpoint device;

reporting the security threat to an administrator of the endpoint device; and increasing security protocols on the endpoint device.

15. A non-transitory computer-readable medium comprising one or more computer-readable instructions that, when executed by at least one processor of a computing device, cause the computing device to:

calculate a reputation score for an endpoint device that indicates a security state of the endpoint device;

determine, based at least in part on the reputation score of the endpoint device, an appropriate frequency with which to request security updates for the endpoint device, wherein:

high frequencies are appropriate for reputation scores indicative of poor security states; and low frequencies are appropriate for reputation scores indicative of healthy security states;

determine, based at least in part on the reputation score of the endpoint device, an appropriate position for the endpoint device within an update-distribution queue maintained by a security server that provides security updates, wherein:

positions near the front of the update-distribution queue are appropriate for the reputation scores indicative of poor security states; and positions near the end of the update-distribution queue are appropriate for the reputation scores indicative of healthy security states;

transmit, from the endpoint device to the security server, a request for the security server to:

send the security updates to the endpoint device with the appropriate frequency; and place the endpoint device at the appropriate position within the update-distribution queue;

receive the security updates from the security server in accordance with at least one of:

the appropriate frequency; and the appropriate position within the update-distribution queue; and apply the security updates within the endpoint device.

16. The computer-readable medium of claim 15, wherein the reputation score for the endpoint device is based on at least one of:

unsafe behaviors performed by a user of the endpoint device that potentially expose the endpoint device to security threats; and security threats already on the endpoint device.

\* \* \* \* \*